June 12, 1928.                                                        1,672,987

W. E. MOUGEY ET AL

METHOD OF BALANCING CABLE CIRCUITS

Filed Feb. 4, 1925

Inventors:
Wilbur E. Mougey
John Collard
by E. W. Adams Atty.

Patented June 12, 1928.

1,672,987

UNITED STATES PATENT OFFICE.

WILBUR E. MOUGEY AND JOHN COLLARD, OF LONDON, ENGLAND, ASSIGNORS TO WESTERN ELECTRIC COMPANY, INCORPORATED, OF NEW YORK, N. Y., A CORPORATION OF NEW YORK.

METHOD OF BALANCING CABLE CIRCUITS.

Application filed February 4, 1925, Serial No. 6,789, and in Great Britain June 5, 1924.

This invention relates to methods of reducing the disturbances in cable communication systems, particularly the interference in coil loaded cable circuits due to neighboring electrical systems, such as transmission lines or electrified traction systems.

The object of this invention is to provide a more efficient means of reducing the susceptibility of communication circuits to interference due to inductive disturbances from neighboring electrical systems.

Previous methods have included, among others, the balancing of the capacity to ground of the two sides of the circuit in a loading section; also the balancing of the inductance added to the two sides of the circuit by each Pupin coil, and the balancing of the resistance of the two sides of a circuit both in the loading section and in the Pupin coils by care in manufacture and in installation.

In all the previous known methods, however, the balancing was confined to determining the proper relation of the circuits in individual loading sections.

The present invention comprises a method whereby a further improvement in balancing is obtained by determining the proper relation of the circuits in a plurality of loading sections. According to this method, unbalance in one loading section, or in one loading coil of a series, is employed to neutralize unbalance in another loading section or loading coil of a series.

Figure 1:
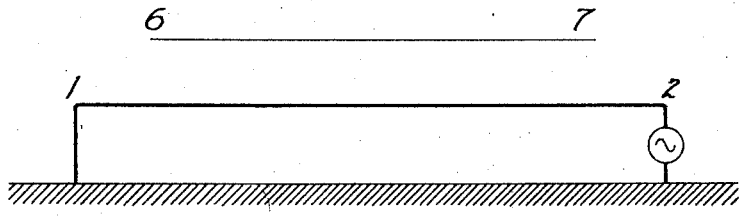
Figure 2:
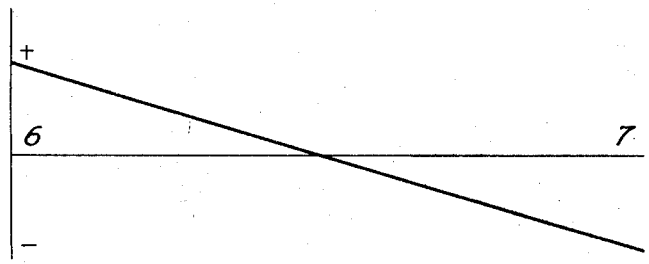
Figure 3:
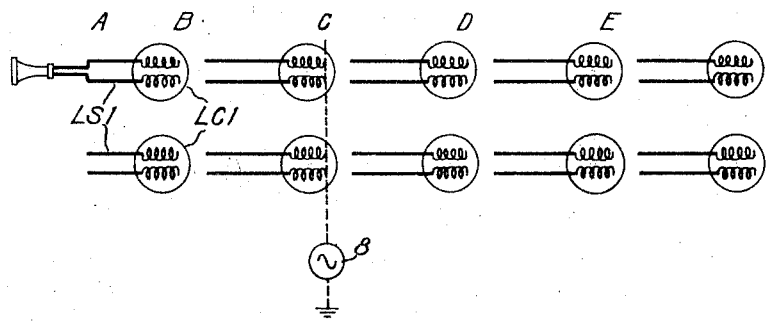

This invention can be more clearly understood by reference to the following description in connection with the drawing, in which Fig. 1 shows diagrammatically a telephone line paralleled by a transmission line. Fig. 2 shows the distribution of the potential induced in the telephone line by currents flowing in the transmission line; and Fig. 3 shows a method of connecting testing apparatus for carrying out this invention.

In communication circuits subject to inductive interference from electrical transmission systems, an electromotive force is generated in each conductor of the communication system. This is illustrated in Figs. 1 and 2, where 6—7 of Fig. 1 shows a conductor in which an electromotive force is induced by the electrical transmission line 1—2.

As shown in Fig. 2, the distribution of the electromotive force induced to ground at any instant for this particular case of a uniform parallel line, that is to say, where the disturbing and disturbed conductors are equidistant at all points and where the current in the inducing conductor is the same at all points along its length, is a straight line. The electromotive force at any point in the conductor acting through the admittance to ground at that point will cause a current to flow and this current flowing through the series impedance of the conductor will cause a voltage drop. The potential to ground at the end of the conductor will depend, therefore, on the values of the admittance to ground and the series impedance of the conductor.

The electromotive forces induced in the two sides of each circuit in the system will be approximately equal. If, however, the series impedance, or admittance to ground of the two sides of a circuit are not equal, the terminal potentials to ground of the two sides of the circuit will be unequal and so will cause a current to flow through any apparatus connected to the end of the circuit, thus producing a noise or disturbance in it. The chief cause of the susceptibility of communication circuits to outside interference is the unbalance of the capacity to ground of the two sides of the circuit. The alternating current leakage to ground is so small in comparison to the capacity to ground that its effect is negligible. Also as usually manufactured, the loading coils add very nearly equal inductances to the two sides of the communication circuits, and the resistances of the two sides of a circuit in a loading section and in a loading coil usually do not differ enough to cause serious trouble from interference.

This invention deals with the elimination of those unbalances in a communication circuit that would cause noise or other disturbances in the circuit if it were subject to inductive interference. The method according to this invention consists in the balancing of an unbalance in one part of the circuit by an unbalance in another part of the circuit, each part consisting of at least one loading section. This balance is carried out in a particular way and under conditions designed to simulate the conditions of approximately equal voltage and current in all conductors that would exist in an actual case of interference.

One of the methods according to this invention is shown in Fig. 3. Each loading coil is first joined to the adjacent loading section, loading coil No. 1 (LC¹) to loading section No. 1 (LS¹) etc. The individual lengths which go to make up these loading sections may be, and preferably have been, previously balanced between themselves by some suitable method, such as that described in U. S. Patent 1,064,933, granted to Blackwell et al., June 10, 1913. The conductors of the loading coil stub at the point C are connected together, and to ground through a source of alternating current 8 having a suitable wave form. The circuits are temporarily joined by appropriate means at the splice B in various combinations, and a comparison between the tone which is heard in the receiver at the point A, is made for each combination. The wires are then joined at the point B for each circuit in such a manner as to utilize that combination which has been found to make the tone in the receiver, connected across that circuit at A, a minimum.

The exact theory of this method would require that all the wires which are concerned, should be connected together and to the source of alternating current at the point C. Also that when trying the combinations at B for any circuit, all the other circuits should be joined through at B. In practice, this procedure is found too cumbersome and sufficiently good results will ordinarily be obtained by putting tone on the quad under test at the point C in the manner described, and temporarily joining the four conductors at the point B when a comparison is made to determine the best method of joining a circuit in the line A—B to a circuit in the line B—C. In practice, it will usually be found sufficient to join a quad in the part B—C to any desired quad in the part A—B, the pairs being joined either straight or with the wires crossed, according to which gives the minimum tone in the receiver. If necessary, a quad in the part B—C can be tried in various combinations with different quads in the part A—B, and the combination which is found to give the lowest values can be used. The splice C is made in a similar manner with the source of tone connected at D, and the succeeding splices D, E, and F etc. are made in a similar manner, the receiver always remaining at A. When the middle of a repeater section or a line between two exchanges is reached, it will usually be found best to commence at the other end of the line and to work backward toward the middle, the receiver remaining always at the far end of the line and the source of tone being applied in the manner similar to that just described. The final splice between the two halves can usually be made without any special tests. If necessary, this splice can be treated in a similar manner to the other splices, the receiver being at one end of the line and the source of tone at the other.

A number of variations of the above method can be devised but the principle of this invention is the balancing of the two legs of telephone circuits over distances greater than a loading section in order to secure a reduced susceptibility to interference from extraneous sources; and the application of a source of alternating current and of a receiver substantially in the manner above described to ascertain when the desired degree of balance is obtained.

The invention claimed is:

1. The method of balancing a transmission circuit, composed of a plurality of groups of conductors arranged to be connected in series to form a plurality of parallel circuits, which comprises applying a source of potential between the conductors at one end of one group and ground, and connecting to said conductors the conductors of an adjacent group which give a minimum tone in a receiver connected at the remote end of said last-mentioned group of conductors and to a pair thereof.

2. A method of balancing a communication system comprising a plurality of groups of conductors arranged to be connected in series to form a plurality of parallel transmission circuits, each conductor of each group having a loading coil associated with it, which comprises connecting the ends of the conductors of one group together and to ground through a source of potential, temporarily connecting the conductors of an adjacent group to said first-mentioned conductors, determining the tone in a receiver connected across the end of the conductors of said last-mentioned group remote from said first-mentioned group, reconnecting the conductors of said two groups in another combination, determining the tone in a receiver connected across the remote ends of said second-mentioned conductors, and permanently connecting the conductors of said two groups in that arrangement which gives a minimum tone in the receiver.

3. The method of balancing according to claim 2 which comprises using said two connected groups as one group, and connecting to said new group an adjacent group in the same manner as said first two groups are connected.

4. The method of balancing according to claim 2 in which the conductors of each group are composed of a plurality of sections which have been balanced before being connected together.

5. A method of reducing the disturbing effects due to inductive interference on coil loaded communication circuits in which the said communication circuits are divided into lengths consisting of one or more loading sections and loading coils, which comprises joining together said lengths in such a manner as to balance successively each length against the lengths previously connected, said balance being determined by choosing the conductors of said lengths which are to be connected together by the tone in a receiver connected across a pair of conductors at one end, when an electro-motive force is applied between the conductors concerned and ground at the other end.

In witness whereof, we hereunto subscribe our names this 2nd day of January A. D., 1925.

WILBUR E. MOUGEY.
JOHN COLLARD.